United States Patent
Hong et al.

(10) Patent No.: US 8,451,473 B2
(45) Date of Patent: May 28, 2013

(54) PRINTER IDENTIFICATION AND MOBILE PRINTING

(75) Inventors: Jiang Hong, San Jose, CA (US); Jayasimha Nuggehalli, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 52 days.

(21) Appl. No.: 13/185,446

(22) Filed: Jul. 18, 2011

(65) Prior Publication Data

US 2013/0021638 A1 Jan. 24, 2013

(51) Int. Cl.
*G06F 15/00* (2006.01)
*G06K 1/00* (2006.01)
*G06K 15/00* (2006.01)
*G06F 3/12* (2006.01)

(52) U.S. Cl.
USPC .................................... 358/1.14; 358/1.13

(58) Field of Classification Search
None
See application file for complete search history.

(56) References Cited

U.S. PATENT DOCUMENTS

| 7,970,817 | B2 * | 6/2011 | Hagiuda et al. | 709/203 |
| 2003/0014446 | A1 * | 1/2003 | Simpson et al. | 707/527 |
| 2011/0179202 | A1 * | 7/2011 | Kim | 710/74 |

* cited by examiner

*Primary Examiner* — Douglas Tran
(74) *Attorney, Agent, or Firm* — Hickman Palermo Truong Becker Bingham Wong LLP

(57) ABSTRACT

Techniques are provided for displaying encoded data that represent a) features and options currently supported by a printing device, b) a printer identifier for the printing device, and c) network service interface data for a network service, wherein the network service interface data allow a mobile device to send print settings selection data and electronic document identification data to the network service; and processing print data and causing a printed version of an electronic document reflected in the print data to be printed by the printing device.

20 Claims, 5 Drawing Sheets

PRINTER IDENTIFICATION AND MOBILE PRINTING

FIELD OF THE INVENTION

The present invention relates to printing a document from a mobile device, and more specifically to identifying a printing device based on encoded data displayed by the printing device, queuing a printing job for the printing device at a network service and allowing the printing device to retrieve the printing job from the network service.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Conventionally, printing a document from a mobile device may require identifying the printing devices that are available in a user's network, establishing connectivity with the available printing device and sending a printing job to the printing device for processing. Identifying a printing device available in the user's network is referred to as a printer-discovery process. A printer's discovery is often limited to discovering only those printing devices that are in the user's local network. Therefore, the user can only print on the printing devices located in the user's local network, but not on the printing devices located remotely.

Furthermore, performing printer-discovery, determining a printing driver suitable for the printing device, physically locating the printing device, entering a job release code to the printing device and initiating a printing job on the printing device can be tedious and time-consuming because many MFPs have simple user interfaces with limited functionality.

Moreover, a user may be unfamiliar with an interface that is specific to a particular printing device. Therefore, the process of selecting the printer's features and options by navigating the unfamiliar printer's interface can be difficult and disappointing.

SUMMARY

Techniques are provided for utilizing encoded data of a printing device to identify an available printer, queue a printing job for the printing device at a network service that acts as a repository, and allow the printing device to retrieve the printing job from the network service. A printing device displays the encoded data and a mobile device scans or photographs the encoded data from the printing device. The mobile device uses the encoded data to identify the printing device and to queue a printing job at the network service for the printing device to retrieve it and process. Encoded data represent various types of information comprising a) features and options that are currently supported by the printing device, b) a printer identifier of the printing device, and c) network service interface data for a network service.

A network service acts as a data repository; it receives and stores print settings selection data and electronic document identification data from a mobile device, and allows a printing device to retrieve the print settings selection data and the electronic document identification data from the network service. In response to the retrieving, the printing device processes the print setting selection data and the electronic document identification data, and produces a printed copy of an electronic document.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0 OVERVIEW
2.0 SYSTEM ARCHITECTURE
 2.1 PRINTING DEVICE
 2.2 OPERATIONAL PANEL OF A PRINTING DEVICE
 2.3 NETWORK SERVICE
 2.4 MOBILE DEVICE
3.0. COMMUNICATIONS UTILIZING ENCODED DATA
4.0 QUEUING A PRINTING JOB AND RETRIEVING THE PRINTING JOB
5.0. IMPLEMENTATION MECHANISMS 1.0 Overview An approach is provided for utilizing encoded data of a printing device to identify the printing device and to facilitate an electronic document printing from a mobile device by queuing a printing job at a network service and allowing the printing device to retrieve the printing job from a queue maintained by the network service.

2.0 System Architecture

Figure 1:
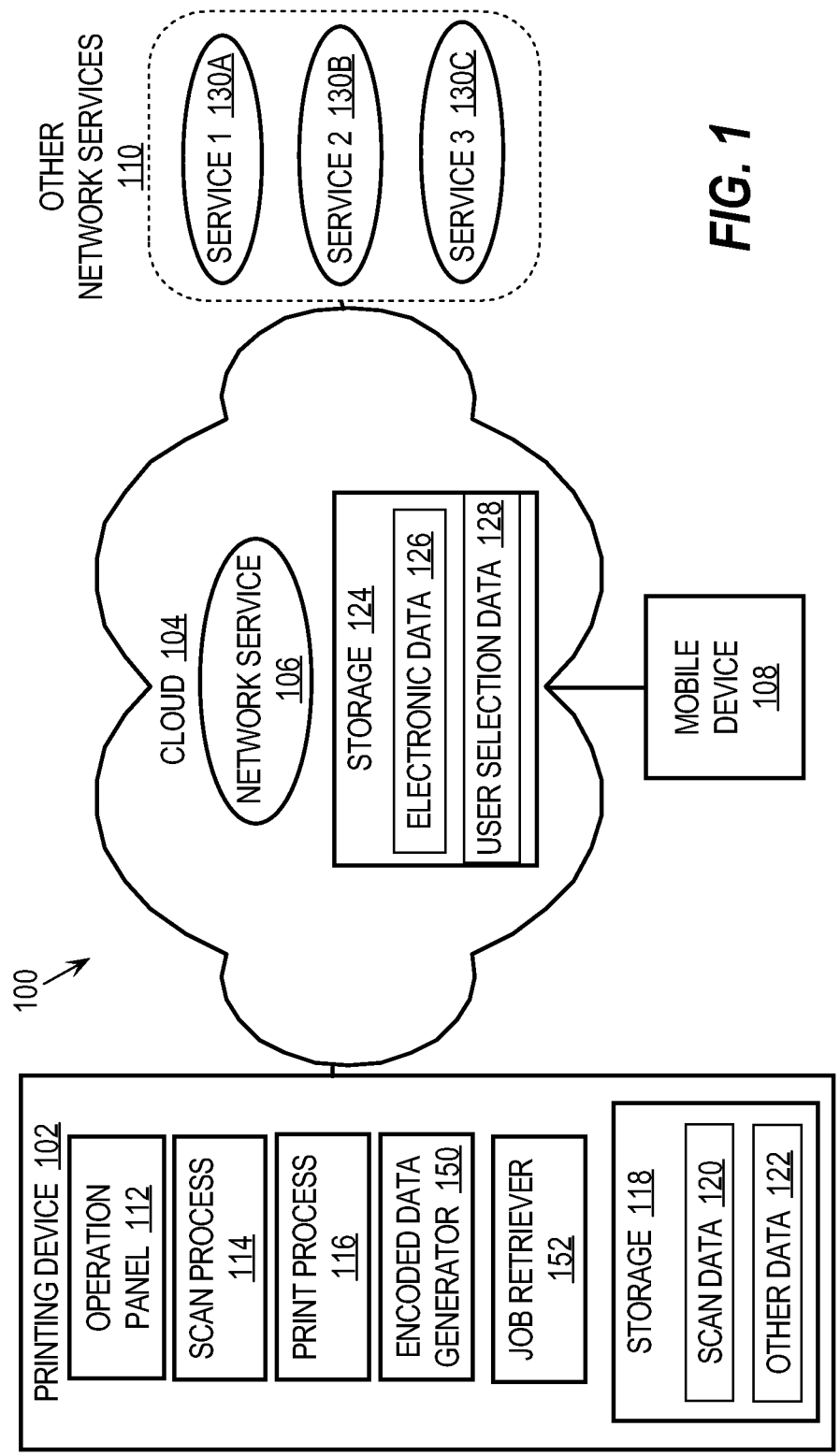
FIG. 1 is a block diagram depicting example system architecture for utilizing encoded data of a printing device according to an embodiment of the invention.

FIG. 1 is a block diagram depicting example system architecture 100 for utilizing encoded data of a printing device according to an embodiment of the invention. Architecture 100 includes a printing device 102, a cloud 104, a mobile device 108, and other network services 110 that are communicatively coupled to cloud 104. For illustration purposes only, other network services 110 include external services 130A-C, which may provide storage and repository capabilities for storing, archiving and organizing electronic documents. However, embodiments of the invention are not limited to the external services 130A-C. There may be any number (or none) of other network services 110 that are communicatively coupled to cloud 104.

The communications links between cloud 104 and each of printing device 102, mobile device 108, and other network services 110 may be implemented by any medium or mechanism that provides for the exchange of data between the elements of FIG. 1. Examples of such links include, without limitation, a network such as a Local Area Network (LAN), Wide Area Network (WAN), Ethernet or the Internet, or one or more terrestrial, satellite or wireless links.

2.1 Printing Device

Printing device 102 is a network device that is configured to communicate with a network service 106 in cloud 104 and process various document data. Although the description herein refers to printing device 102 and processing printing jobs, printing device 102 may be a multi-functional peripheral (MFP) 102, and be configured to perform not only printing, but also scanning, faxing and other types of document processing.

For example, MFP 102 may be configured to scan one or more printed documents and generate scanned document data that represent one or more electronic document data. The scanned document data may be in a variety of formats, depending upon a particular implementation. One example format is the portable document format (PDF) by Adobe Systems, Inc. MFP 102 may also be configured to convert scanned document data from a non-text format, such as PDF, to a text-based format, using various data conversion techniques, such as optical character recognition (OCR) method. MFP 102 can further be configured to transmit the scanned document data to another location, such as storage 124 of network service 106, over a communications link established between MFP 102 and cloud 104.

In an embodiment, printing device 102 implements the capability to process electronic document data stored in storage 118. Printing device 102 can also be configured to download the electronic document data from storage 124 of network service 106 to storage 118.

In FIG. 1, printing device 102 includes an operation panel 112, a scan process 114, a print process 116, encoded data generator 150, job retriever 152 and storage 118. The operation panel 112 is configured to display information to a user and to accept user input.

Implementations of operation panel 112 may vary depending upon architecture of printing device 102. In an embodiment, operation panel 112 may include a screen having a touch-screen portion, on which a graphical user interface (GUI) is displayed. The touch screen can allow a user to select icons and GUI objects on the GUI. The GUI may be updated to reflect changes in the functionalities offered by the printing device 102. The operation panel 112 may also include control buttons and a numeric keypad for receiving user input. Example of operation panel 112 is described in more detail below with reference to FIG. 2.

Scan process 114 is configured to cause one or more printed documents to be scanned by printing device 102 and to generate scanned document data that represent the one or more printed documents. Scan process 114 may be initiated, for example, in response to a user's selection of a scan-start control button (not depicted in FIG. 1).

Print process 116 is configured to cause one or more documents to be printed by printing device 102 based on corresponding electronic document data. Print process 116 may be initiated, for example, in response to a user's selection of a print-start control button (not depicted in FIG. 1), or in response to a printing device completing a download of the electronic document data and user's selections of the features and options associated with the electronic document from network service 106.

In an embodiment, to enable printing a particular printing job, print process 116 retrieves information specific to a printing job. Such information can include print setting selection data and electronic document identification data. The print setting selection data provides description of the features and options for the features that printing device 102 should apply while performing the printing job. The electronic document identification data comprises information identifying an electronic document to be printed by printing device 102. For example, the electronic document identification data may comprise the electronic document name, a web link to the electronic document data, a pointer to the electronic document data, or any other information that allows printing device 102 to retrieve and download the electronic document data to storage 118.

Print process 116 is configured to download electronic document data to storage 118, and in particular, to the part of storage 118 labeled on FIG. 1 as other data 122. The electronic document data can be downloaded to storage 118 from storage 124, from storage associated with external network services 110, or any other storage available to printing device 102.

Encoded data generator 150 is configured to generate and display encoded data specific to printing device 102. Encoded data are used to allow other devices, such as mobile device 108, to identify printing device 102, to determine the capabilities of printing device 102, and to indicate a job queue for queuing printing jobs for printing device 102.

In an embodiment, encoded data can be generated using a variety of data encoding techniques. For example, the encoded data can be encoded using a quick response (QR) code technique.

Quick response (QR) code is a two dimensional code for representing data in a graphical form. The data are encoded to strings containing ones and zeros, and the strings are represented graphically as rows and columns containing black and white pixels. For example, a QR code may utilize a two-dimensional array of pixels, wherein each pixel can have associated one of two Boolean values. For instance, if according to the coding, a particular pixel has associated the Boolean value of "1," then the pixel is filled with a black rectangle or square. However, if according to the coding, a particular pixel has associated the Boolean value of "0," then the pixel is filled with a white rectangle or square. Using the coding, the rows and columns of the two-dimensional array are filled with black and white rectangles, and groups of the pixels are interpreted as the encoded data. Other combinations of associations between the Boolean values and colors of the rectangles are also contemplated.

In other embodiment, encoded data can be a bar code, in which data are encoded to a string containing ones and zeros, and the strings are represented graphically as a row of black and white bars. The encoded data can also be represented by one or more symbols, one or more alphanumeric characters, or any other form of coding.

In an embodiment, encoded data generator 150 is configured to generate encoded data to represent specific information and to display the encoded data to make the encoded data available to other devices. In an embodiment, encoded data represent a) features and options that are currently supported by printing device 102, b) a printer identifier for printing device 102, and c) network service interface data for a network service.

Encoded data generator 150 encodes the features and options that are currently supported by printing device 102 and displays the encoded data to allow other devices to determine the capabilities of printing device 102. Examples of the features and options currently supported by printing device 102 can include duplex option, finisher features, the types of paper format that are available on printing device 102, the types of formatting that are available on printing device 102, color or black/white printing, collate or not-collate, etc.

Encoded data generator 150 encodes the printer's identifier and displays the encoded data to allow other devices to determine the identifier of the printer and to use the identifier when sending printing jobs to a job repository. Examples of a printer's identifier can include a device identifier (ID), a device model identifier (Model), a device serial number, etc.

Encoded data generator 150 encodes the network service interface data for a network service and displays the encoded data to allow other devices to determine the network service interface of the network service from which printing device 102 can download printing jobs. Examples of network service interface data can comprise a uniform resource identifier (URI) of network service, an email address of network service, etc.

Other types of data specific to printing device 102 can also be included in the encoded data.

Other types of data specific to network service 106 can also be included in the encoded data. For example, the encoded data can comprise an application programming interface (API) key for validating a client access to cloud 104 and network service 106 when cloud 104 and network service 106 require client's authorization. For example, network service 106 can be a secure process that grants access only if the clients are successfully authorized to an authorization server (not depicted in FIG. 1). The authorization server can be communicatively coupled to cloud 104. The API key can be used by mobile device 108 and printing device 102 before each of the respective devices gains access to network service 106.

Encoded data generator 150 can repeat the encoding and regenerating encoded data for a variety of reasons. For example, encoded data generator 150 can regenerate the encoded data when a location of the network service is changed and the old method, included in the old encoded data, for establishing a communications link with the network service is obsolete. In such a situation, encoded data generator 150 can be provided with the updated network service information data and regenerate the encoded data to reflect the updated method for establishing a communications link with the new network service.

According to another example, encoded data generator 150 can repeat the encoding and regenerating encoded data when printing device 102 has been upgraded and the features and options of the upgraded printing device 102 have changed. For example, printing device 102 can be upgraded to provide additional features that were not available when the old encoded data were generated. In such a situation, encoded data generator 150 can be provided with the updated information about the features and options currently supported by the updated printing device and regenerate the encoded data to reflect the updated features and options currently supported by the updated printing device.

According to other example, encoded data generator 150 can repeat the encoding and regenerating encoded data when printing device 102 is relocated to another network, another physical location or altered in any way that requires a change in a printing device identifier. In such a situation, a new printing device identifier is generated, provided to encoded data generator 150 and used to regenerate the encoded data to reflect the new printing device identifier.

In an embodiment, encoded data comprise information about all the features and options that are currently supported by printing device 102. Therefore, by acquiring the encoded data and decoding the encoded data, other devices, such as mobile device 108, can determine the capabilities of printing device 102, and can generate a graphical user interface (GUI) that is specific to printing device 102.

In an embodiment, encoded data comprise a printing device identifier. The printing device identifier can be any alphanumeric code, containing letters, numbers and/or special characters. The printing device identifier can have a fixed or variable length. The printing device identifier uniquely identifies printing device 102 in system 100. Therefore, no two printing devices in system 100 can have the same printing device identifier.

Printing device identifier is used by mobile device 108 to identify printing device 102 and to communicate the printing device identifier to network service 106 when mobile device 108 has a printing job to be performed by printing device 102. Once mobile device 108 identifies printing device 102, mobile device 108 can deposit one or more printing jobs in a repository, such as network service 106, for printing device 102 to retrieve it and to perform.

In an embodiment, encoded data comprises network interface data that mobile device 108 can use to establish a communications link with cloud 104 and to communicate with network service 106. For example, the network interface data can provide information that specifies a uniform resource identifier (URI) of a network device on which cloud 104 is implemented, and methods for mobile device 108 to communicate with network service 106. According to another example, the network interface data can provide an email address of a network device on which cloud 104 and network services 106 are implemented and the email protocol identifier that mobile device 108 can use to identify email protocol for communicating with network services 106.

In an embodiment, printing device 102 displays encoded data on operation panel 112 for other devices to read, scan or retrieve, and process. For example, the encoded data may be displayed on operation panel 112 as an electronically generated light-emitting diode (LED) display, or as a sticker affixed to the operation panel 112, a wireless signal emitted by printing device 102, or displayed using any other method facilitating providing the encoded data to other devices.

The encoded data can be acquired by other devices, such as mobile device 108, using a variety of techniques. For example, the encoded data displayed by printing device 102 can be scanned by a scanner of mobile device 108, and interpreted by mobile device 108 using the same encoding schema that encoded data generator 150 used to generate the encoded data. According to another example, the encoded data can be photographed by a camera of mobile device 108, and interpreted by mobile device 108. According to other example, the encoded data, emitted by an infra-red emitter of printing device 102, can be captured by an infra-red sensor of mobile device 108. According to other example, the encoded data, transmitted using a wireless signal transmitter of printing device 102, can be received by a wireless signal receiver of printing device 102. Other methods of acquiring the encoded data of printing device 102 by mobile device 108 are also contemplated.

Job retriever 152 is configured to establish a communications link with network service 106, inquire whether any printing job has been queued at storage 124 of network service 106 for printing device 102, and if so, retrieving the printing job from storage 124 and storing the printing job in storage 118 of printing device 102. To inquire about a printing job queued at storage 124, job retriever 152 can provide to network service 106 a printer's identifier. The printer's identifier can be used to identify a job queue stored at a repository of network service 106.

In an embodiment, job retriever 152 establishes a communications link with network service 106 by using a web browser application, described in detail below.

Storage 118 may be any combination of volatile or non-volatile storage for storing data used by printing device 102. For example, storage 118 may be random access memory (RAM), one or more disks, or any combination of RAM and one or more disks for storing scanned document data. As depicted in FIG. 1, storage 118 may store scan data 120 and other data 122. Other data 122 may include electronic document data or other types of data, such as word processing document files.

Printing device 102 may include other modules and processes that are not depicted in FIG. 1 for purposes of brevity.

2.2 Operational Panel of a Printing Device

Figure 2:
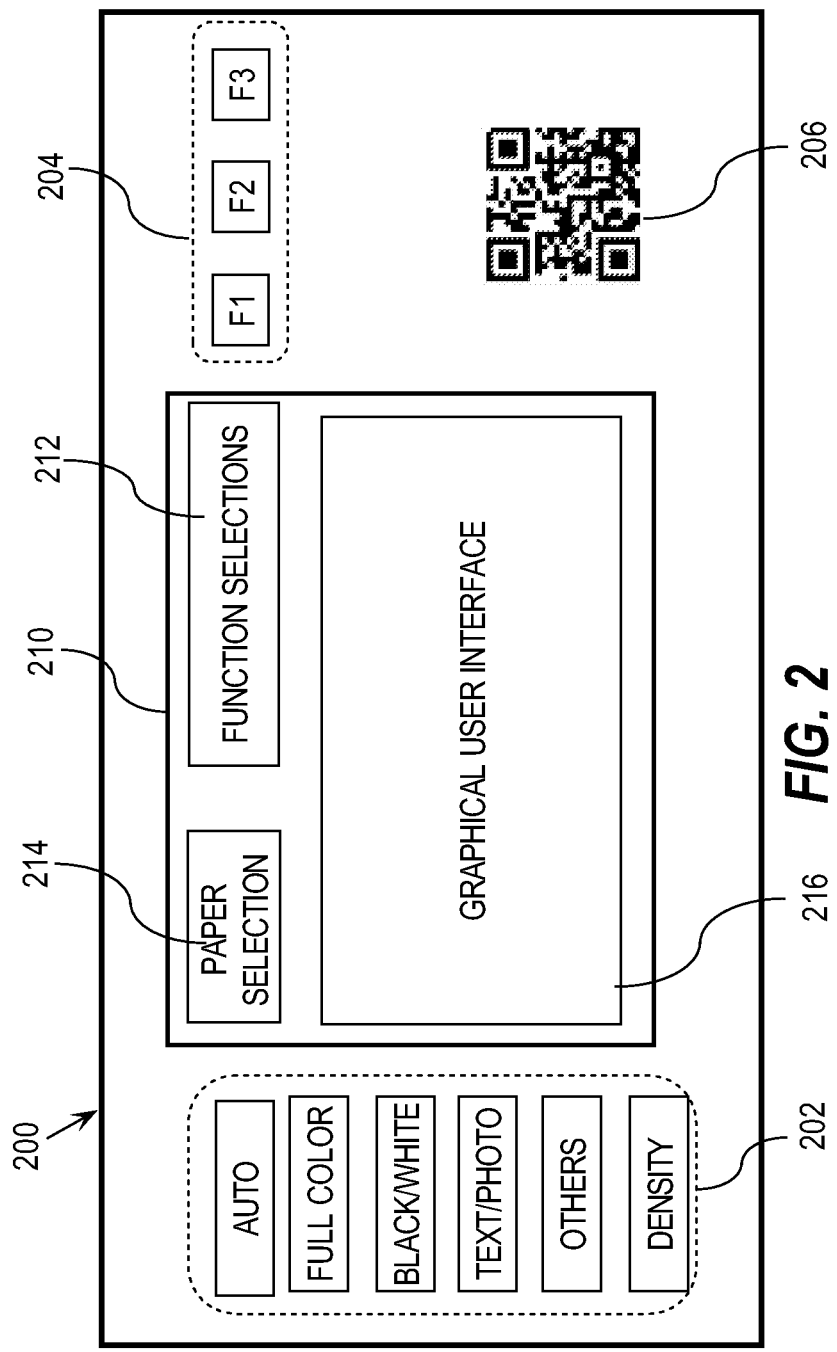
FIG. 2 depicts an example operation panel of a printing device according to an embodiment of the invention.

FIG. 2 depicts an example operation panel 200 of printing device 102. Operation panel 200 includes a set of user interface controls 202 for activating functions of printing device 102. The user interface controls on operation panel 200 may be graphical, non-graphical, or a combination of graphical and non-graphical.

Operation panel 200 may be arranged in many different ways and the arrangements depend on the implementation of printing device 102. For example, as depicted in FIG. 2, operation panel 200 may have job settings buttons 202 (such as an automatic default setting control, full color setting control, black and while setting control, text/photo setting control, density setting control, and others), paper selection buttons 214, function selection buttons 212, additional function buttons 204, graphical user interface 216 and encoded data display 206.

The functions implemented on any particular printing device 102 may vary depending upon the implementation of printing device 102. For example, if a particular printing device 102 is a multi-functional peripheral (MFP), then the functions of printing device 102 can include not only printing, but also copying, connecting to a document server, faxing and other functions.

In an embodiment, operation panel 200 can also include a numeric keypad, and a set of user controls for toggling the power, starting a function, and clearing the current function (not shown in FIG. 2). These are examples of the user controls that are typically included on a MFP. More or fewer user controls may be provided, depending upon a particular implementation of printing device 102.

Operation panel 200 can also include a graphical user interface (GUI) 216 for displaying information and receiving user input. GUI 216 may be a touch screen that is capable of detecting user selection of icons and GUI objects displayed on GUI 216. GUI 216 may be stored on printing device 102 and loaded directly from local storage 118 of printing device 102.

In an embodiment, GUI 216 is generated based on the features and options for the features that are specific to printing device 102.

Encoded data display 206 can represent encoded data that identify printing device 102, features and options specific to printing device 102 and network interface data for establishing a communications link with network service 106. The encoded data display 206 is used to communicate the encoded data to other devices, such as mobile device 108. For example, encoded data display 206, displaying the encoded data, can be scanned by a scanner of mobile device 108. Scanning of the encoded data displayed in encoded data display 206 allows mobile device 108 to acquire information identifying printing device 102, information identifying the features and options of printing device 102 and information identifying methods for establishing a communications link with network service 106 to retrieve one or more printing jobs for printing device 102.

Encoded data may be encoded using a variety of formats. For example, the encoded data may be encoded as a quick reference (QR) code, a two-dimensional array of black and white pixels that uniquely represent a piece of information. The encoded data can also be encoded as a bar code, one or more symbols, one or more alphanumeric characters, or any other encoding techniques known in the art.

Encoded data display 206 can be an electronic LED display projecting an electronic display of the encoded data, a sticker affixed to operation panel 200 containing printed encoded data, a display generated by an infra-red signal emitter, a signal generated by a wireless signal emitter generating the encoded data, or any other form of display configured to communicate the encoded data to other devices.

2.3 Network Service

Referring again to FIG. 1, in an embodiment, a network service 106 is a part of a separate network 104, referred herein as a cloud 104. Alternatively, network service 106 may be implemented on a standalone computer that is communicatively coupled with printing device 102 and mobile device 108.

A "cloud" is a computing system communicatively coupled to printing device 102 and mobile device 108, and configured to provide processing power, storage, processing and other computing services to printing device 102 and mobile device 108 often via a web browser.

In an embodiment, from the perspective of printing device 102 and mobile device 108, cloud 104 can be viewed as a collection of services and a data repository. At the hardware level (although transparent to printing device 102 and mobile device 108), cloud 104 comprises one or more network devices that host a plurality of services.

The services offered by cloud 104 are accessible to printing device 102 and mobile device 108 via the Internet using any of the data communications protocols, such as the Transmission Control Protocol (TCP), the Internet Protocol (IP), and other protocols. Each of the services in cloud 104 may be associated with a different communications protocol, a different IP address and/or port number.

Cloud 104 may be maintained by a single individual user or an organization, such as a company, an association, a university, or other entity. An example of a cloud is the VACS (Value-Added Cloud Solution) provided by Ricoh Company, Ltd.

Multiple organizations can share responsibility for maintaining a particular cloud. A network service "outside" of cloud 104, such as any of external network services 110 in FIG. 1, can be provided by one or more individual users or organizations that are different than any individual user or organization that maintains could 104. Thus, other network services 110 are considered "third-party services" relative to the services in cloud 104.

In FIG. 1, cloud 104 includes a network service 106 that is configured to maintain job queues for printing devices, including a job queue for printing device 102. Network service 106 can also be configured to receive one or more printing jobs from mobile device 108, placing the received printing jobs in respective job queues and allowing printing devices, such as printing device 102, to access the respective printing job queue to retrieve the stored printing jobs.

Non-limiting examples of network service 106 can include Box.net™, Google Docs™, Salesforce.com™, Evernote™, and Jigsaw™.

Cloud 104 may also include an OCR service (not shown) for converting scanned document data in non-text format, for example PDF, into text-based format. Cloud 104 may also include a forwarding service (not shown) for transmitting scanned document data in text format to one or more recipients. The OCR service and the forwarding service may be implemented as part of network service 106. Alternatively, the OCR service and the forwarding service may be implemented separately from network service 106. For example, the OCR service and the forwarding service can be implemented as one of other network services 106.

In an embodiment, cloud 104 also comprises storage 124 that may store different types of data, for example, electronic document data 126 and user selection data 128. Electronic document data 124 stores electronic document data that comprise document data, such as text data. Electronic document data 124 can also store pointers to documents, document data links, and other document data identification information that can be used to identify and download the document data. For example, mobile device 108 can store a web link to a document that a user of the mobile device 108 would like to print on printing device 102. Network service 106 can retrieve the web link from electronic document data 126, use the web link to retrieve the particular document data and download the particular document data to storage 118.

In an embodiment, user selection data 128 stores data that indicate the specific features and options for the features of printing device 102 that a user of mobile device 108 selected as appropriate for printing an electronic document data on printing device 102. For example, the user settings data can include information that the particular electronic document should be printed in a landscape format, on an A4-format paper, as a black and white printed document.

Storage 124 may be implemented as any type of volatile or non-volatile storage for storing data used by network service 106. For example, storage 124 may be random access memory (RAM), one or more disks, or any combination of RAM and one or more disks for storing scanned document data.

2.4 Mobile Device

Mobile device 108 is communicatively coupled with cloud 104 and other devices in system 100. In an embodiment, mobile device 108 communicates with cloud 104 by providing, to cloud 104, printer identification data of a printer, identification information of an electronic document to be printed, and user's selected features and options to be used in processing and printing the document on the printer.

Mobile device 108 may be implemented as any type of device equipped with wireless-communication capabilities, capabilities to generate, display and interact with a graphical user interface, capabilities to access the Internet, and other capabilities specific to the mobile device technology. Non-limiting examples of mobile device 108 include, without limitation, cellular telephony devices such as cell phones, personal digital assistants (PDAs), and a tablet device.

Mobile device 108 can be configured to display, on a touch screen display, a series of graphical displays, each of which provides a user with choices, and each of which is configured to accept the user's selection and to communicate the user's selections to other applications residing on mobile device 108.

In an embodiment, mobile device 108 hosts one or more applications facilitating communications with mobile device 108 and facilitating execution of various tasks. For example, mobile device 108 can host an interface application that allows a user to authenticate to mobile device 108, an application that allows scanning information from printing device 102, an application that allows communicating with cloud 104, and other applications that allow communicating with other devices in system 100. Alternatively, mobile device 108 can execute one robust application that is designed to provide a variety of services, including the services described above.

In an embodiment, mobile device 108 executes an application that causes prompting a user of mobile device 108, via a user interface, to enter authentication information, such as a username and password. Once the authentication information is entered, the user is not required to re-enter the authentication information. The authentication information may be stored, for example persistently, on mobile device 108. Thus, if, subsequently, the user attempts to access one or more services in cloud 104, then another application or applications can retrieve the already provided authentication information and send the authentication information to cloud 104.

In an embodiment, mobile device 108 executes a web browser application that causes scanning or photographing encoded data displayed by printing device 102. The scanned encoded data of printing device 102 comprises the printer's identifier that uniquely identifies printing device 102. Furthermore, the encoded data of printing device 102 can comprise information about features and options available on printing device 102. The encoded data can also comprise network service interface data that provide methods for communicating with network service 106. Moreover, the encoded data of printing device 102 can comprise authentication information for validating access to network service 106.

In an embodiment, mobile device 108 can identify a printing device from a plurality of printing devices available to mobile device 108, and acquire a printer identifier specific to the identified printing device.

In an embodiment, mobile device executes a web browser application that causes generating a graphical user interface (GUI) to display the features and options of printing device 102. The web browser application can also be configured to receive a user's selection of the electronic document to be printed and a user's selection of the features and their corresponding options to be used in printing the electronic document on printing device 102.

The user's selections of the electronic document to be printed and the features and options for the respective features to be utilized in printing the electronic document can also be referred to as printing selection information, or print data.

In an embodiment, the web browser application can also be configured to cause sending the user's selections of the electronic document, the features and options, and printing device identifier to network service 106 in cloud 104. Upon receiving the user's selections and the printing device identifier, network service 106 can identify a job queue that network service 106 maintains for the printing device, identified by the printing device identifier, and store the user's selections in the identified job queue for future retrieval by the printing device.

Because more than one printing devices may be available for printing to mobile device 108, network service 106 can maintain a separate job queue for each printing device from the plurality of printing devices. Therefore, mobile device 108 sends to network service 106 the printer identifier that uniquely identifies the printing device selected by the user of mobile device 108. Network service 106 uses the received printer identifier to select a job queue that is associated with the specific printing device that is identified by the received printer identifier.

In an alternative embodiment, the above steps are performed by an application that is not a web-based browser. Such an application may comprise various modules for scanning encoded data displayed by printing device 102, processing the scanned data, generating and displaying a graphical user interface (GUI) for depicting the features and options currently available on printing device 102, accepting the user's selections of the features and options, accepting the user's selection of an electronic document for printing, establishing a communications link with network service 106 and sending the user's selections and a printer identifier to network service 106. In such an embodiment, any updates to the application can be distributed to each mobile device individually and configured on each mobile device individually. In contrast, with a browser-based implementation, such updates may not be required. Instead, any updates to a web browser-based application may be distributed when each of the mobile devices establishes a communications link with the network service or distributed in a form of a broadcast to mobile devices.

In an embodiment, mobile device 108 is equipped with a scanner or a camera to acquire encoded data displayed by printing device 102. For example, a scanner of mobile device 108 is configured to scan the encoded data displayed by printing device 102. Alternatively, a camera of mobile device 108 can be used to photograph the encoded data displayed by printing device 102. The scanned or photographed encoded data can be communicated to an encoding data processing application. Other methods of acquiring the encoded data are also contemplated.

In an embodiment, the encoded data comprises a printer identifier of the printing device. The encoded data can also comprise the features and options for the respective features currently available on the printing device. Furthermore, the encoded data can comprise network interface data that provide information necessary for establishing a communications link with network service 106, and an API key described above.

In an embodiment, an application executed on a mobile device causes one or more selectable icons to be displayed, each of which is associated with a different service. For example, one selectable icon may correspond to printing, another selectable icon may correspond to scanning, and another selectable icon may correspond to faxing.

In an embodiment, the information that is displayed on a screen of mobile device 108 is personalized to the user of mobile device 108. The personalization of the displayed information may be based on previous interactions (such as previous document processing jobs) between mobile device 108 and cloud 104. For example, if the user has used a set of printing job settings in connections with one or more previous printing jobs, then the application can display on option to select that set of printing job settings without having to individually select each setting in the set. The job settings of previous document processing jobs may be stored on mobile device 108 and accessible to the application executing on mobile device 108.

Alternatively, the job settings may be stored in cloud 104 (for example in storage 124) in association with a printer identifier specific to printing device 102. Thus, after the application starts up on mobile device 108, the application requests, from network service 106, one or more sets of job settings for one or more previous document processing jobs and displays selectable data that correspond to each set of job settings.

In an embodiment, the application of mobile device 108 uses the features and options currently available on selected printing device 102 to generate a graphical user interface (GUI) to display the printer-specific features and options. While the features and options displayed in the GUI are specific and unique to the selected printing device 102, the overall design of the GUI may be consistent with the preferences previously selected by the user of mobile device 108. The overall consistency of the GUI design can be maintained by mobile device 108 until the user changes the preferences.

The purpose of maintaining the overall consistency of the GUI design is to provide the GUI with which the user is familiar and comfortable, and which has the same look-and-feel to the user. While the features and options displayed in the GUI are specific to the selected printing device 102, the overall design of the GUI is the same regardless of which printing device is selected from a plurality of printing devices. Since the user is familiar with the overall design of the GUI, the user can more effectively navigate through the features and options, even if the features and the options are specific to one of the printing devices from the plurality of the printing devices.

In an embodiment, the application of mobile device 108 receives a user's selections entered by the user using the GUI. The application stores the selections, processes them and communicates them to, for example, network service 106.

3.0. Communications Utilizing Encoded Data

Figure 3:
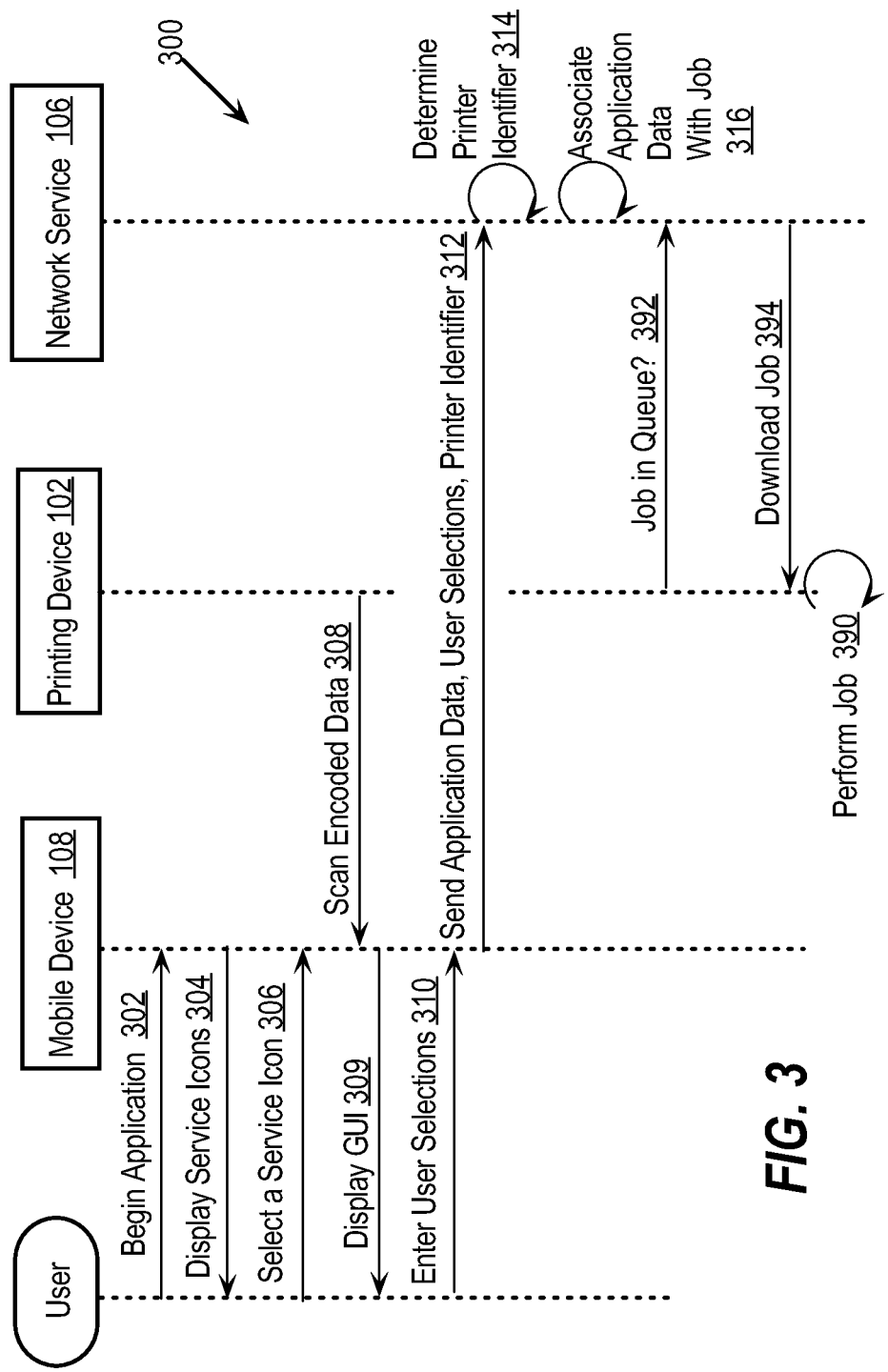
FIG. 3 is a diagram depicting communications exchanged between a printing device, a mobile device and a network service according to an embodiment of the invention.

FIG. 3 is a diagram depicting communications exchanged between a mobile device 108, a printing device 102, a network service 106 and other elements depicted in FIG. 1. In an embodiment, encoded data are displayed by printing device 102, scanned/photographed by mobile device 108, used by mobile device 108 to generate print data, and used by mobile device 108 to send the print data to network service 106. In an embodiment, printing device 102 accesses network service 106, and retrieves the print data from a job queue maintained by network service 106.

In step 302, a user initiates the execution, on mobile device 108, of a job printing application. For example, the user can select an icon representing the job printing application and launch the application.

In step 304, in response to the user's initiation of the job printing application, the job printing application causes one or more service icons to be displayed on a screen of mobile device 108. The service icons may include, without limitation, a print service icon.

In step 306, the user selects one of the displayed service icons. In an embodiment, the user selects the icon that represents a printing capability.

In step 308, in response to user selection of one of the displayed service icons, the application causes activating a scanner or a camera of mobile device 108 to scan or photograph encoded data displayed by printing device 102. For example, the user can approach printing device 102, point the scanner or the camera of mobile device 108 to the display of encoded data on printing device 102, and press a button to activate the scanner or the camera to capture the encoded data displayed by printing device 102.

In other embodiment, the encoded data can be acquired by utilizing an infra-red sensor for capturing an infra-red signal emitted by an infra-red emitter of printing device 102. In other embodiment, the encoded data can be received by a wireless signal receiver of mobile device 108 that is configured to capture a signal transmitted by a wireless signal transmitter of mobile device 108. Other implementations are also contemplated.

In step 309, mobile device processes the received encoded data, decodes the encoded data and extracts the features and options currently available on printing device 102 from the decoded data. For example, the features and options can specify the types of formatting available for a document printing, the types of paper formats available for a document printing, the types of finishing options available on printing device 102, and other features and options for the respective features currently available on printing device 102. Furthermore, in step 309, mobile device uses the features and options to generate and display a graphical user interface on mobile device 108.

In an embodiment, the graphical user interface (GUI) presents to a user the features options that are specific to printing device 102; however the overall design of the GUI is consistent with the user's preferences and does not change when a different printing device is selected from a plurality of printing devices.

Maintaining the consistency of the overall design of the GUI allows displaying the GUI with which the user is familiar and which the user can navigate comfortably and efficiently. Even if the features and options change as the user selects a different printing device from the plurality of the printing device, the look-and-feel of the GUI displayed on the user's mobile device does not have to change.

In step 310, a user selects one or more features and one or more options for the selected features for a printing job that the user would like to have performed by printing device 102. For example, the user can select that an electronic document should be printed on an A4 format paper, in a landscape format, one-sided, black-and-white and collated.

The user can also provide application data for printing. For example, the application data can be an electronic document that the user wants to have printed. According to another example, the application data can be electronic data identification data, comprising a location indicator of the location of the electronic document that the user wants to have printed. Non-limiting examples of the electronic document identification data include a name of the electronic document, pointer, uniform resource identifiers (URI), and a hyperlink to the electronic document that should be used to retrieve the electronic document for printing.

In step 312, the user's selected features and options, the application data and the printer identifier are sent to network service 106 according to network service interface identification data extracted from encoded data, as described above. The network service interface identification data may indicate, for example, a uniform resource identifier (URI) of the device that hosts network service 106, or an email address of the network service 106. Other forms of network service interface identification data can be also utilized.

In step 314, in response to receiving the user's selected features and options, the application data and the printer identifier, network service 106 processes the received information and extracts the printer identifier. Network service 106 uses the printer identifier to store the received user's selected features and option and the application data in an association with the printer identifier.

In step 316, network service 106 associates the printer identifier with the received user's selected features and options and the application data.

If the application data is represented as electronic document identification data (a name of the electronic document, name, pointer, URI, hyperlink, etc.), then network service 106 can use the electronic document identification data to determine a location of the corresponding electronic document data, download the corresponding electronic document data to storage 124 associated with network service 106, and translate the downloaded electronic document data to print data in the format that printing device 102 understands.

In an embodiment, network service 106 stores the received user's selected features and options and application data in association with the received printer identifier. Various data structures and various storing methods can be used for storing the association of the received data and the received printer identifier. For example, network service 106 can store the user's selected features and options and application data in a data structure identified by a printer identifier. Non-limiting examples of such structures may include data tables, data arrays, job queues, and multidimensional data structures.

In an embodiment, the steps 302-316 are repeated each time a user of mobile device 108 (or any other user of system 100) wishes to store a printing job in a repository of network service 106. The printing job information is stored in storage of network service 106 and can be reused to repeat the printing of the same document and using the same features and options. Alternatively, the printing job information may be updated partially by, for example, updating the electronic document identification data. Thus, the information about the features and options can be reused while different electronic documents are printed.

In step 392, printing device 102 establishes a communications link with network service 106 and inquires whether any printing job is stored in a job queue maintained by network service 106 for printing device 102. Printing device 102 can establish the communications link with network service 106 by using a universal resource identifier (URI) associated with network service 106. According to another example, printing device 102 can establish a communications link with network service 106 by sending an email to network service 106, using an email address provided to printing device 102 in advance. Other methods of establishing communication with network service 106 are also contemplated.

Printing device 102 can make the inquiry at different times and intervals that may vary depending upon a particular implementation. For example, printing device 102 may make periodic inquiries, make one or more inquiries at specified times, or make inquiries in response to the occurrence of particular events.

There are many types of events that may trigger printing device 102 to make an inquiry about whether any print jobs are currently stored for printing device 102 in cloud 104. For example, printing device 102 may make an inquiry in response to entering a powered up state or in response to transitioning from a power save state to an active state. As another example, printing device 102 may make an inquiry in response detecting selection of one or more user interface objects or functions via operation panel 112. As yet another example, printing device 102 may make an inquiry in response to a request from a mobile device, such as mobile device 108.

If network service 106 has stored at least one print job for printing device 102, then printing device 102 requests and/or downloads the stored printing jobs from a printing job queue maintained by network service 106, and executes them in step 390.

Once the stored printing jobs are downloaded to printing device 102, the printing jobs are deleted from the printing job queue associated with network service 106.

However, if network service 106 does not have any printing jobs stored in a printing job queue for printing device 102 at the moment, then printing device 102 remains idle until printing device 102 can again inquire about printing jobs at network service 106.

In an embodiment, step 392 may be periodically repeated by printing device 102, or can be performed according to a schedule. In other embodiment, step 392 can be executed when printing device 102 is not busy performing other jobs, or when printing device 102 performs a routine check of the job queues maintained for printing device 102 by any network service, other service or repository in system 100.

4.0 Queuing a Printing Job and Retrieving the Printing Job

Figure 4:
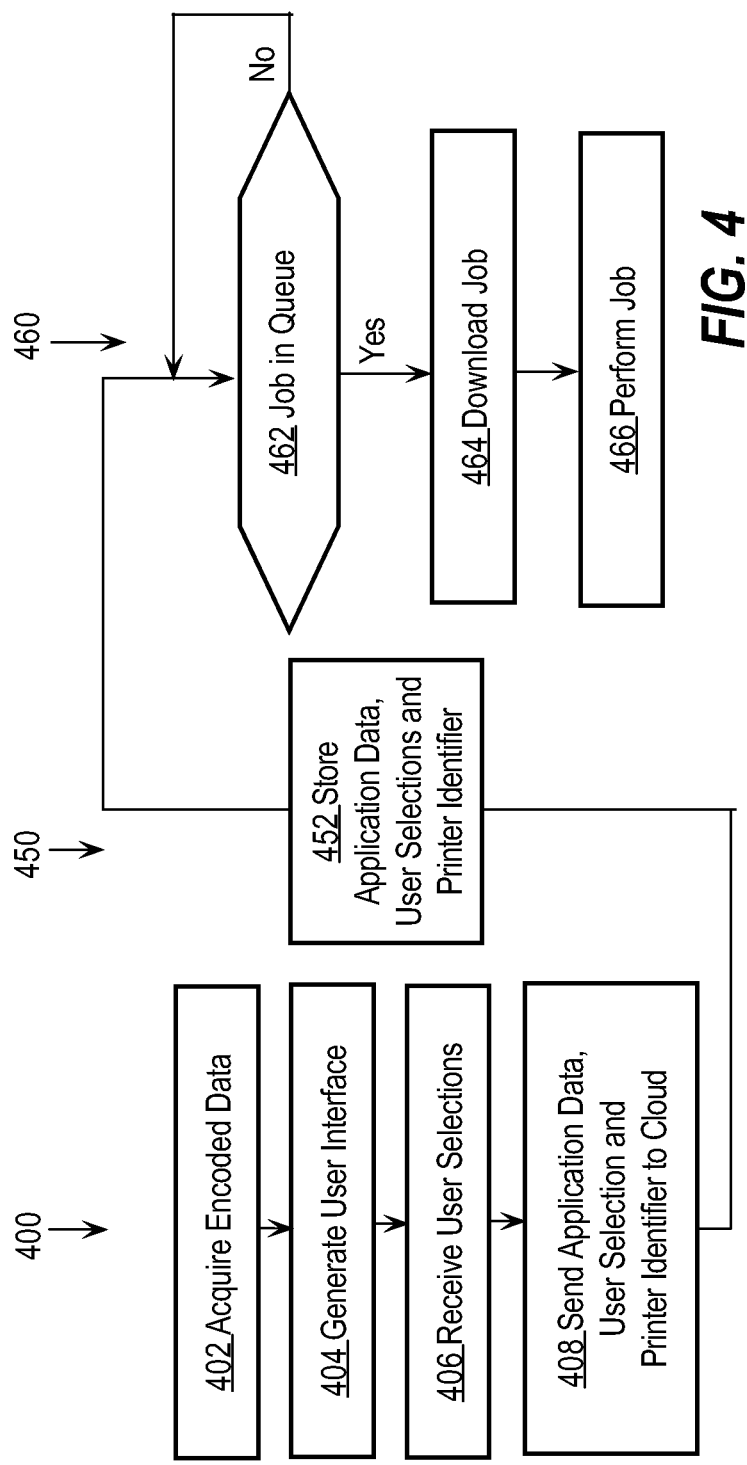
FIG. 4 is a flow diagram depicting an approach for utilizing encoded data of a printing device according to an embodiment of the invention.

FIG. 4 is a flow diagram that depicts an approach for utilizing encoded data of a printing device according to an embodiment of the invention. As indicated below, some of the steps depicted in flow diagram can be performed by an application executed on mobile device 108; other steps can be performed by network service 106 and/or one or more other network services 110; yet other steps can be performed by printing device 102.

For clarity, in FIG. 4, an element 400 points to steps 402-408 that can be performed by mobile device 108; an element 450 points to step 452 that can be performed by network service 106; and an element 460 points to steps 462-466 that can be performed by printing device 102.

In an embodiment, steps 402-408 are performed by an application of mobile device 108.

In step 402, an application of mobile device 108 acquires encoded data of printing device 102 from printing device 102. In an embodiment, the encoded data can be scanned by a scanner of mobile device 108, transmitted to a decoder of mobile device 108 and interpreted. Alternatively, the encoded data can be photographed by a camera of mobile device 108 and transmitted from the camera to the decoder.

As described above, the encoded data can be encoded/decoded using a variety of techniques, including a quick response (QR) coding.

In an embodiment, the encoded data represent a) features and options that are currently supported by printing device 102, b) a printer identifier for printing device 102, and c) network service interface data for a network service 106.

In step 404, an application of mobile device 108 uses the encoded data, and in particular, the information about the features and options that are currently supported by printing device 102, to generate a graphical user interface (GUI) to provide a graphical representation of the features and options available on printing device 102. While the GUI provides the representation of the features and options that are specific to printing device 102, the overall design of the GUI is based on the preferences that the user provided in advance. Therefore, the GUI looks-and-feels similarly to the user regardless of the type of printing device.

In step 406, an application of mobile device 108, receives user's selections that the user entered using the GUI displayed on mobile device 108. The user's selections may indicate the user's selected features and options, and application data, described above. For example, the user could have entered that he wants to print a particular electronic document on an A4-format paper and in color.

In step 408, an application of mobile device 108 sends the user's selected features and options, the application data and the printer identifier (extracted from the encoded data) to network service 106.

The application can establish a communications link with network service 106 according to network service interface data extracted from encoded data provided by printing device 102. For example, the network service interface data may comprise an URI of network service 106, which a web-browser based application of mobile device 108 can use to access network service 106. In addition, the web-browser based application of mobile device 108 can also use an API key, also extracted from the encoded data, to gain access to network service 106 if network service 106 is a secure device.

According to another example, the network service interface data may comprise an email address of network service 106, which an email-processing application of mobile device 108 can use to send to network service 106 an email containing the user's selections and the printer's identifier.

In an embodiment, step 452 is executed by network service 106.

In step 452, network service 106 receives user's selected features, options, document data and a printer's identifier from mobile device 108. As described above, the user's selected document data can comprise an electronic document itself, or electronic document identification data, such as a name, a pointer, a URI, or a hyperlink to the electronic document that the user wants to print. The user's selections of the features and options comprise the specific features and options that should be applied when the electronic document is printed. The printer's identifier is an identifier that uniquely identifies a particular printing device in a plurality of printing device in system 100.

In an embodiment, network service 106 associates the received user's selected features, options and document data with the received printer identifier, and stores the received user's selected features, options and document data in association with the printer's identifier. The associations can be stored in various data structures, such as data tables, data arrays, job queues, or multidimensional data structures.

If the associations are stored in job queues, then network service 106 determines whether a printing job queue has been already created by network service 106 for the printing device identified by the received printer's identifier. If such a queue has been already created, then network service 106 adds the received user's selected features, options and document data to the queue identified by the respective printer's identifier. However, is such a queue has not been already created for the received printer's identifier, then network service 106 creates a print job queue for the printing device identified by the received printer's identifier, and stores the received user's selected features, options and document data in the respective queue.

In an embodiment, if the received document data comprise electronic document identification data, then network service 106 uses the electronic document identification data to identify a corresponding electronic document, downloads the electronic document to a cache of network service 106, converts the electronic document to a printable electronic document according to the user's selected features and options, and stores the printable electronic document in the queue for printing device 102.

In an embodiment, steps 462-466 are performed by printing device 102.

In step 462, printing device 102 requests printing jobs from network service 106. For example, a job-polling application can establish a communications link with network service 106 (using for example, a URI of network service 106) and inquire whether network service 106 has stored any printing job for printing device 102. The inquiry can comprise the printer's identifier, which helps the network service 106 to identify a print job queue that network service 106 maintains for printing device 102.

In response to determining that no printing job is available for printing device 102 from network service 106 at the moment, printing device can continue executing the job-polling application and continue inquiring whether a printing job became available for printing device 102 at network service 106.

However, in response to determining that at least one printing job is available for printing device 102 from network service 106, the job-polling application can proceed to step 466.

In step 466, the job-polling application of printing device 102 downloads one or more printing jobs from network service 106. In an embodiment, printing device 102 can download print data from storage of network service 106 to storage of printing device 102. Furthermore, printing device 102 can download the user's selection of the features and options that printing device 102 should apply while printing the print data on printing device 102.

If more than one printing job is available at network service 106 for printing by printing device 102, in an embodiment, the job-polling application of printing device 102 can download one printing job at the time, initiate the printing of the downloaded printing job, and proceed to downloading another printing job from network service 106 once the printing of the previous printing job was completed. Alternatively, the job-polling application of printing device 102 can download all printing jobs that are stored at network service 106 at the particular time, and initiate the printing of the downloaded printing jobs once all the printing jobs have been downloaded from network service 106 to printing device 102.

5.0 Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
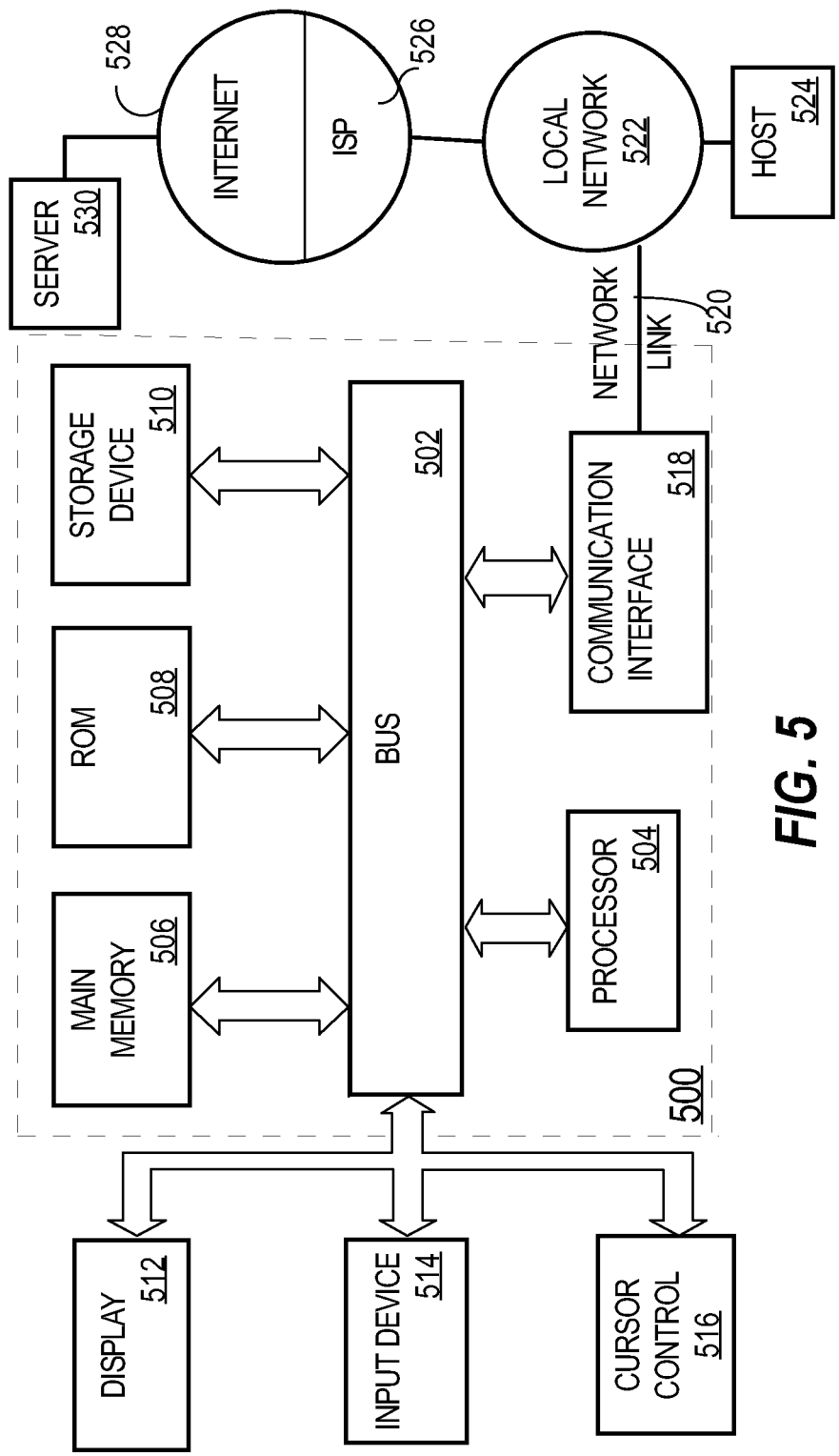
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A printing device comprising:
   one or more processors;
   a print process configured to process print data and cause a printed version of an electronic document represented by the print data to be printed by the printing device;
   a display for displaying encoded data that represent a) features and options currently supported by the printing device, b) a printer identifier for the printing device, and c) network service interface data for a network service, wherein the network service interface data allow a mobile device to send print settings selection data and electronic document identification data to the network service.

2. The printing device of claim 1, wherein the printing device is further configured to transmit the encoded data to the mobile device using a wireless communications link.

3. The printing device of claim 1, wherein the encoded data are displayed in a manner that can be captured by one or more scanning devices and one or more cameras.

4. The printing device of claim 1, wherein the encoded data are in a machine-readable format.

5. The printing device of claim 1, wherein the display is further configured to display an updated encoded data that are different than the encoded data and that represent a) the features and options currently supported by the printing device, b) the printer identifier for the printing device, and c) updated network service interface data for the network service.

6. The printing device of claim 1,
   wherein the encoded data are encoded as one or more of: a quick response (QR) code, a bar code, one or more symbols, one or more alphanumeric characters;
   wherein the encoded data further comprise an application programming interface key comprising authentication information to validate access to the network service;
   wherein the printer identifier is an alphanumeric string that comprises one or more of: a printing device identification number, a printing device model number, a printing device serial number;
   wherein the network service interface data comprise one or more of: a uniform resource identifier (URI), an email address, a network address.

7. The printing device of claim 1, wherein the printing device further comprises an encoded data generator for generating the encoded data.

8. One or more non-transitory computer-readable storage media storing instructions which, when executed by one or more processors, cause the one or more processors to perform:
   displaying encoded data that represent a) features and options currently supported by a printing device, b) a printer identifier for the printing device, and c) network service interface data for a network service, wherein the network service interface data allow a mobile device to send print settings selection data and electronic document identification data to the network service;
   processing print data and causing a printed version of an electronic document represented by the print data to be printed by the printing device;
   wherein the steps are performed by one or more computing devices that are different than the mobile device and the network service.

9. The non-transitory computer-readable storage media of claim 8, further comprising instructions which, when executed by the one or more processors, cause the one or more processors to perform:
   transmitting the encoded data to the mobile device using a wireless communications link.

10. The non-transitory computer-readable storage media of claim 8, wherein the encoded data are displayed in a manner that can be captured by one or more scanning devices and one or more cameras.

11. The non-transitory computer-readable storage media of claim 8, further comprising instructions which, when executed by the one or more processors, cause the one or more processors to perform:
    displaying an updated encoded data that are different than the encoded data and that represent a) the features and options currently supported by the printing device, b) the printer identifier for the printing device, and c) updated network service interface data for the network service.

12. The non-transitory computer-readable storage media of claim 8, wherein the encoded data are in a machine-readable format.

13. The non-transitory computer-readable storage media of claim 8,
    wherein the encoded data are encoded as one or more of: a quick response (QR) code, a bar code, one or more symbols, one or more alphanumeric characters;
    wherein the encoded data further comprise an application programming interface key comprising authentication information to validate access to the network service;

wherein the printer identifier is an alphanumeric string that comprises one or more of: a printing device identification number, a printing device model number, a printing device serial number;

wherein the network service interface data comprise any of: a uniform resource identifier (URI), an email address, a network address.

14. The non-transitory computer-readable storage media of claim 8, further comprising instructions which, when executed by the one or more processors, cause the one or more processors to perform generating the encoded data.

15. A mobile device comprising:
one or more processors;
an encoded data receiver configured to receive encoded data;
an encoded data processor configured to process the received encoded data to obtain data that represent a) features and options currently supported by a printing device, b) a printer identifier for the printing device, and c) network service interface data for a network service, wherein the network service interface data allow the mobile device to send print settings selection data and electronic document identification data to the network service.

16. The mobile device of claim 15, wherein the mobile device further comprises one or more scanners and one or more cameras for capturing the encoded data.

17. The mobile device of claim 15, wherein the mobile device further comprises a wireless communications receiver configured to receive the encoded data over a wireless communications link.

18. The mobile device of claim 15, wherein the encoded data are in a machine-readable format.

19. The mobile device of claim 15,
wherein the encoded data are encoded as one or more of: a quick response (QR) code, a bar code, one or more symbols, one or more alphanumeric characters;

wherein the encoded data further comprise an application programming interface key comprising authentication information to validate access to the network service;

wherein the printer identifier is an alphanumeric string that comprises one or more of: a printing device identification number, a printing device model number, a printing device serial number;

wherein the network service interface data comprise one or more of: a uniform resource identifier (URI), an email address, a network address.

20. The mobile device of claim 15, wherein the mobile device is further configured to:
generate a user interface based on the features and options currently supported by the printing device;
detect user selections of one or more user-selected features and options;
receive the electronic document identification data;
send the one or more user-selected features and options, the electronic document identification data and the printer identifier to the network service according to the network service interface data.

* * * * *